US012459517B2

(12) United States Patent
Yamaguchi et al.

(10) Patent No.: US 12,459,517 B2
(45) Date of Patent: Nov. 4, 2025

(54) WORK VEHICLE

(71) Applicant: KUBOTA CORPORATION, Osaka (JP)

(72) Inventors: Tetsuo Yamaguchi, Sakai (JP); Ryoma Iwase, Sakai (JP); Tomonari Tsuchida, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 208 days.

(21) Appl. No.: 18/511,522

(22) Filed: Nov. 16, 2023

(65) Prior Publication Data

US 2024/0166211 A1 May 23, 2024

(30) Foreign Application Priority Data

Nov. 17, 2022 (JP) ................. 2022-184322

(51) Int. Cl.
*B60W 30/182* (2020.01)
*B60W 30/14* (2006.01)
*B60W 40/12* (2012.01)
*F16H 47/04* (2006.01)

(52) U.S. Cl.
CPC ........ *B60W 30/182* (2013.01); *B60W 30/143* (2013.01); *B60W 40/12* (2013.01); *F16H 47/04* (2013.01); *B60W 2510/0283* (2013.01); *B60W 2510/0638* (2013.01); *B60W 2510/1015* (2013.01); *B60W 2720/10* (2013.01)

(58) Field of Classification Search
CPC ............ B60W 30/182; B60W 30/143; B60W 2510/0283; B60W 2510/0638; B60W 2510/1015; B60W 2510/09; B60W 2720/10; F16H 47/04
See application file for complete search history.

(56) References Cited

U.S. PATENT DOCUMENTS

| | | | |
|---|---|---|---|
| 6,447,423 B1 | 9/2002 | Cannon et al. | |
| 11,028,558 B2 * | 6/2021 | Oasa | F16H 61/435 |
| 11,035,462 B2 * | 6/2021 | Oasa | F16H 61/47 |
| 11,953,091 B2 * | 4/2024 | Miyazaki | B60W 30/188 |
| 2021/0332875 A1 | 10/2021 | Tsuchida et al. | |
| 2022/0316592 A1 | 10/2022 | Faggiani et al. | |

FOREIGN PATENT DOCUMENTS

JP 2019-095058 A 6/2019

OTHER PUBLICATIONS

Official Communication issued in corresponding European Patent Application No. 23210367.1, mailed on Mar. 27, 2024.

* cited by examiner

*Primary Examiner* — Huan Le
(74) *Attorney, Agent, or Firm* — Keating & Bennett, LLP

(57) ABSTRACT

A work vehicle includes a controller configured or programmed to include an input revolutions number calculator to calculate an input revolutions number, and a vehicle speed controller switchable between a first vehicle-speed control mode and a second vehicle-speed control mode. In the first vehicle-speed control mode, the vehicle speed controller is configured or programmed to control a vehicle speed of the work vehicle based on a value detected by an input rotation sensor. In the second vehicle-speed control mode, the vehicle speed controller is configured or programmed to control the vehicle speed based on a value calculated by the input revolutions number calculator.

12 Claims, 6 Drawing Sheets

WORK VEHICLE

CROSS REFERENCE TO RELATED APPLICATIONS

This application claims the benefit of priority to Japanese Patent Application No. 2022-184322 filed on Nov. 17, 2022. The entire contents of this application are hereby incorporated herein by reference.

BACKGROUND OF THE INVENTION

1. Field of the Invention

The present invention relates to a work vehicle.

2. Description of the Related Art

JP 2019-95058 A discloses a conventional work vehicle including a hydraulic pump, a hydraulic motor, a hydrostatic, continuously variable transmission, a planetary transmission, and a forward/backward travel switching device. The hydraulic pump ("hydraulic pump 50") is drivable by motive power from an engine ("engine 6"). The hydraulic motor ("hydraulic motor 51") is drivable by pressurized oil from the hydraulic pump. The continuously variable transmission ("continuously variable transmission 21") is configured to vary motive power from the engine and output the varied motive power. The planetary transmission ("compound planetary power transmission 22") is configured to receive motive power from the engine and motive power from the continuously variable transmission, composite the motive power from the engine and the motive power from the continuously variable transmission, and output the composite motive power. The forward/backward travel switching device ("forward/backward travel switching device 30") is switchable between a forward-travel power transmission state and a backward-travel power transmission state. In the forward-travel power transmission state, the forward/backward travel switching device switches motive power from the planetary transmission into forward-travel motive power and output the forward-travel motive power to a movable body ("front wheels 4", "rear wheels 5"). In the backward-travel power transmission state, the forward/backward travel switching device switches motive power from the planetary transmission into backward-travel motive power and output the backward-travel motive power to the movable body.

Conventional work vehicles are configured to detect the number of revolutions of the input shaft ("input shaft 95") of the forward/backward travel switching device with use of a sensor and bring the number of revolutions closer to a target value to control the vehicle speed. Conventional work vehicles may, however, be incapable of accurately detecting the number of revolutions of the input shaft with use of a sensor depending on the number of revolutions, leaving room for improvement in accurate control of the vehicle speed.

The above circumstances have led to a demand for a work vehicle capable of accurately controlling its speed.

SUMMARY OF THE INVENTION

A work vehicle according to a preferred embodiment of the present invention includes an engine, a movable body, a hydrostatic continuously variable transmission including a hydraulic pump drivable by motive power from the engine, and a hydraulic motor drivable by pressurized oil from the hydraulic pump, the continuously variable transmission being operable to vary the motive power from the engine and output the varied motive power, a planetary transmission to receive the motive power from the engine and the motive power from the continuously variable transmission, composite the motive power from the engine and the motive power from the continuously variable transmission, and output the composite motive power, a forward and backward travel switching device switchable between a forward-travel power transmission state and a backward-travel power transmission state, such that, in the forward-travel power transmission state, the forward and backward travel switching device switches the motive power from the planetary transmission into forward-travel motive power and outputs the forward-travel motive power to the movable body, and in the backward-travel power transmission state, the forward and backward travel switching device switches the motive power from the planetary transmission into backward-travel motive power and outputs the backward-travel motive power to the movable body, an engine rotation sensor to detect a number of revolutions of the engine, a hydraulic motor rotation sensor to detect a number of revolutions of the hydraulic motor, an input rotation sensor to detect an input revolutions number as a number of revolutions of motive power inputted to the forward and backward travel switching device, and a controller configured or programmed to include an input revolutions number calculator to calculate the input revolutions number based on a value detected by the engine rotation sensor and a value detected by the hydraulic motor rotation sensor; and a vehicle speed controller switchable between a first vehicle-speed control mode and a second vehicle-speed control mode, such that, in the first vehicle-speed control mode, the vehicle speed controller is configured or programmed to control a vehicle speed of the work vehicle based on a value detected by the input rotation sensor, and in the second vehicle-speed control mode, the vehicle speed controller is configured or programmed to control the vehicle speed based on a value calculated by the input revolutions number calculator.

With the above configuration, the vehicle speed controller is switchable between a first vehicle-speed control mode and a second vehicle-speed control mode. If the input rotation sensor is unable to accurately detect an input revolutions number, the vehicle speed controller is in the second vehicle-speed control mode to control the vehicle speed based on the value calculated by the input revolutions number calculator. This allows the vehicle speed to be controlled accurately.

The vehicle speed controller may be configured or programmed to be in the second vehicle-speed control mode while the vehicle speed is low.

While the vehicle speed is low, the input revolutions number is low. The input rotation sensor might be unable to accurately detect a low input revolutions number. With the above configuration, while the vehicle speed is low, the vehicle speed controller is configured or programmed to be in the second vehicle-speed control mode to control the vehicle speed based on the value calculated by the input revolutions number calculator. This allows the vehicle speed to be controlled accurately even if the input revolutions number is low.

The vehicle speed controller may be configured or programmed to be switched from the second vehicle-speed control mode into the first vehicle-speed control mode at a first threshold value of the vehicle speed and from the first vehicle-speed control mode into the second vehicle-speed control mode at a second threshold value of the vehicle speed which second threshold value is smaller than the first threshold value.

The above configuration prevents the vehicle speed controller from being switched too frequently between the first and second vehicle-speed control modes.

The controller may be configured or programmed to further include a breakdown determiner to determine whether the hydraulic motor rotation sensor is broken down, and the vehicle speed controller may be configured or programmed to not switch into the second vehicle-speed control mode if the breakdown determiner has determined that the hydraulic motor rotation sensor is broken down.

The above configuration prevents the vehicle speed controller from being switched into the second vehicle-speed control mode if the hydraulic motor rotation sensor is broken down.

The controller may be configured or programmed to further include a breakdown determiner to determine whether the engine rotation sensor is broken down, and the vehicle speed controller may be configured or programmed to not switch into the second vehicle-speed control mode if the breakdown determiner has determined that the engine rotation sensor is broken down.

The above configuration prevents the vehicle speed controller from being switched into the second vehicle-speed control mode if the engine rotation sensor is broken down.

The controller may be configured or programmed to further include a breakdown determiner to determine whether the input rotation sensor is broken down, and the vehicle speed controller may be configured or programmed to not switch into the first vehicle-speed control mode if the breakdown determiner has determined that the input rotation sensor is broken down.

The above configuration prevents the vehicle speed controller from being switched into the second vehicle-speed control mode if the input rotation sensor is broken down.

The work vehicle may preferably further include an auxiliary transmission to vary motive power from the forward and backward travel switching device, and the vehicle speed controller may be configured or programmed to be in the second vehicle-speed control mode while the auxiliary transmission is operating in a lowest speed.

With the above configuration, while the vehicle speed is low, the vehicle speed controller is switched into the second vehicle-speed control mode to control the vehicle speed based on the value calculated by the input revolutions number calculator. This allows the vehicle speed to be controlled accurately even if the input revolutions number is low.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The description below describes preferred embodiments of the present invention with reference to drawings.

Figure 1:
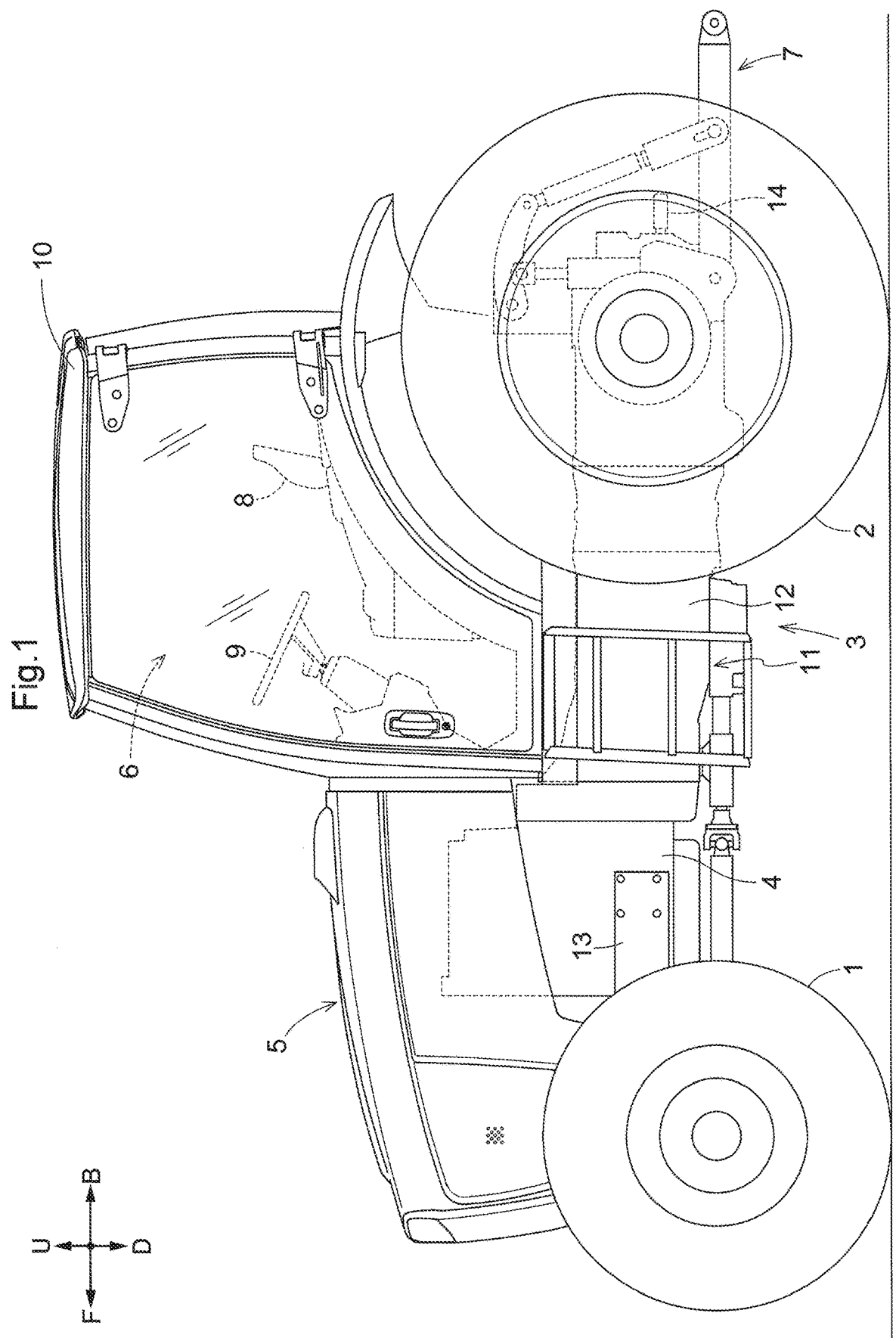
FIG. 1 is a side view of a tractor.

The preferred embodiments described below relate to tractors (which are examples of a "work vehicle") including a body. FIG. 1 shows arrow F to indicate the forward side of the body, arrow B to indicate the backward side of the body, arrow U to indicate the upward side of the body, and arrow D to indicate the downward side of the body. The front side of FIG. 1 corresponds to the left side of the body, whereas the back side of FIG. 1 corresponds to the right side of the body.

As illustrated in FIG. 1, the tractor includes a pair of left and right turnable and drivable front wheels 1 ("movable body"), a pair of left and right drivable rear wheels 2 ("movable body"), and a body 3 supported by the front and rear wheels 1 and 2. The tractor includes a motive section 5 including an engine 4 at a front portion of the body 3. The tractor includes a driver section 6 and a link mechanism 7 at a back portion of the body 3. The driver section 6 is configured to accommodate an operator to drive the tractor. The link mechanism 7 is configured to couple an implement such as a rotary tiller device to the tractor in such a manner that the implement is capable of being lifted and lowered. The driver section 6 includes a driver's seat 8, a steering wheel 9 for use to turn the front wheels 1, and a cabin 10 defining a driver space. The body 3 includes a body frame 11 including an engine 4, a transmission case 12, and front-wheel support frame members 13. The transmission case 12 includes a front portion coupled to a back portion of the engine 4. The front-wheel support frame members 13 are coupled to a lower portion of the engine 4. The tractor includes a power takeoff shaft 14 at a back portion of the transmission case 12. The power takeoff shaft 14 is configured to take off motive power from the engine 4 and transmits the motive power to the implement coupled with use of the link mechanism 7.

Figure 2:
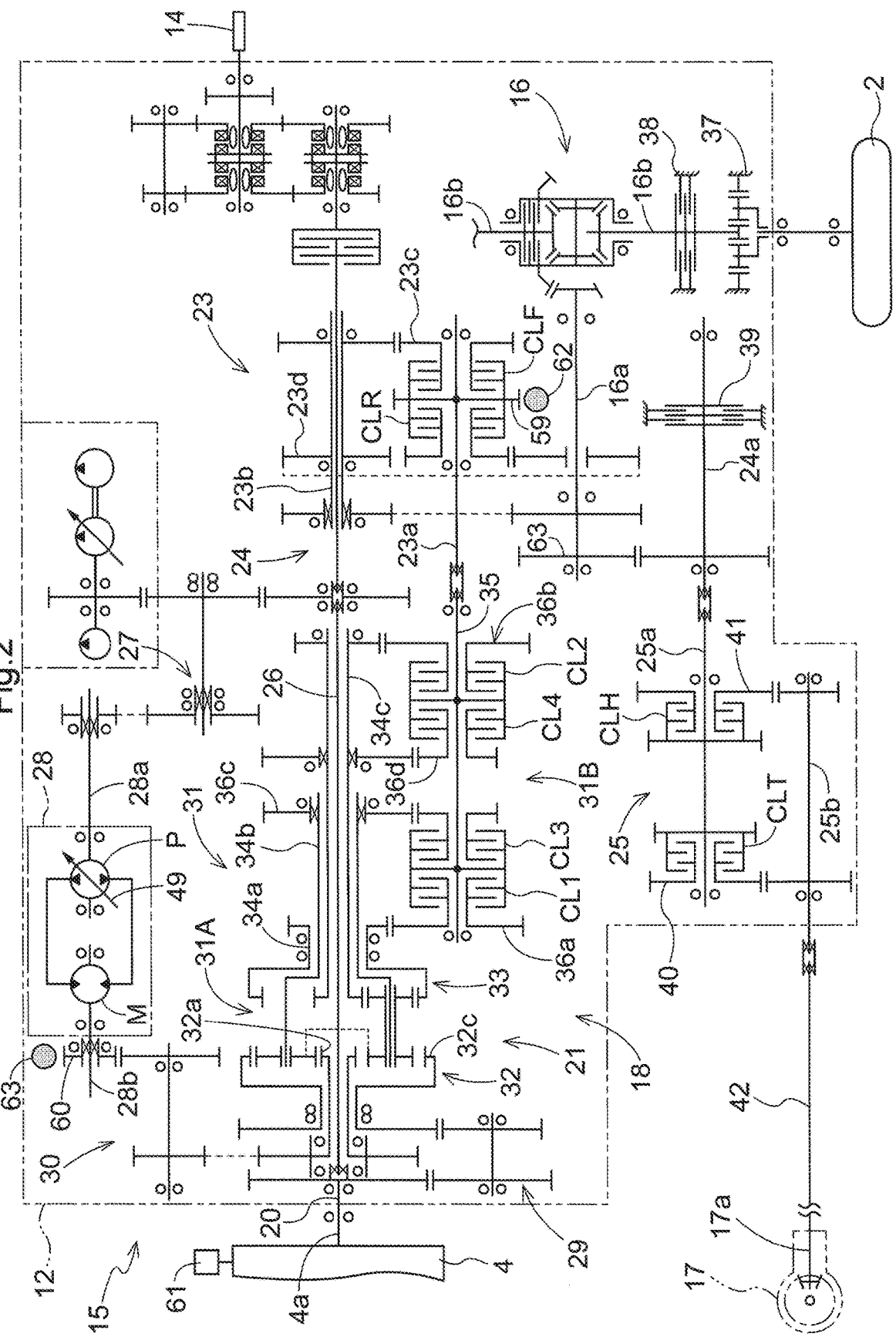
FIG. 2 is a diagram schematically illustrating a power transmission.

FIG. 2 illustrates a power transmission 15 for travel configured to transmit motive power from the engine 4 to the front and rear wheels 1 and 2. The power transmission 15 includes a transmission 18 contained in the transmission case 12 and configured to vary motive power from the engine 4 and transmit the varied motive power to the rear-wheel differential mechanism 16 and the front-wheel differential mechanism 17.

As illustrated in FIG. 2, the transmission 18 includes an input shaft 20, a main transmission 21, a forward/backward travel switching device 23, a gear mechanism 24, and a front-wheel power transmission 25. The input shaft 20 is disposed at a front portion of the transmission case 12 and configured to receive motive power from the output shaft 4a of the engine 4. The main transmission 21 is configured to receive motive power from the input shaft 20, vary the motive power, and output, the varied motive power. The forward/backward travel switching device 23 is configured to receive the output the main transmission 21. The gear mechanism 24 is configured to transmit the output from the forward/backward travel switching device 23 to the input shaft 16a of the rear-wheel differential mechanism 16. The front-wheel power transmission 25 is configured to receive motive power outputted from the forward/backward travel switching device 23, vary the motive power, and output the varied motive power to the front-wheel differential mechanism 17.

As illustrated in FIG. 2, the main transmission 21 includes a continuously variable transmission 28 and a planetary transmission 31. The continuously variable transmission 28 is configured to receive motive power from the input shaft 20. The planetary transmission 31 is configured to receive motive power from the input shaft 20 and the output from the continuously variable transmission 28.

The continuously variable transmission 28, as illustrated in FIG. 2, includes a hydraulic pump P and a hydraulic motor M. The hydraulic pump P has a variable capacity and includes a pump shaft 28a coupled to the input shaft 20 through a rotary shaft 26 and a first gear mechanism 27. The rotary shaft 26 has a front end portion coupled to the input shaft 20. The first gear mechanism 27 is coupled to a back end portion of the rotary shaft 26. The hydraulic motor M is drivable by pressurized oil from the hydraulic pump P. The hydraulic pump P includes a swash plate with an angle changeable to vary motive power from the input shaft 20 into normal-direction motive power or reverse-direction motive power, and is configured to continuously vary the rotation speed of the normal-direction motive power or reverse-direction motive power and output the resulting motive power from a motor shaft 28b. The continuously variable transmission 28 is, in other words, configured to vary motive power from the engine 4 and output the varied motive power. The continuously variable transmission 28 is of a hydrostatic type. The hydraulic pump P is drivable by motive power from the engine 4.

Figure 3:
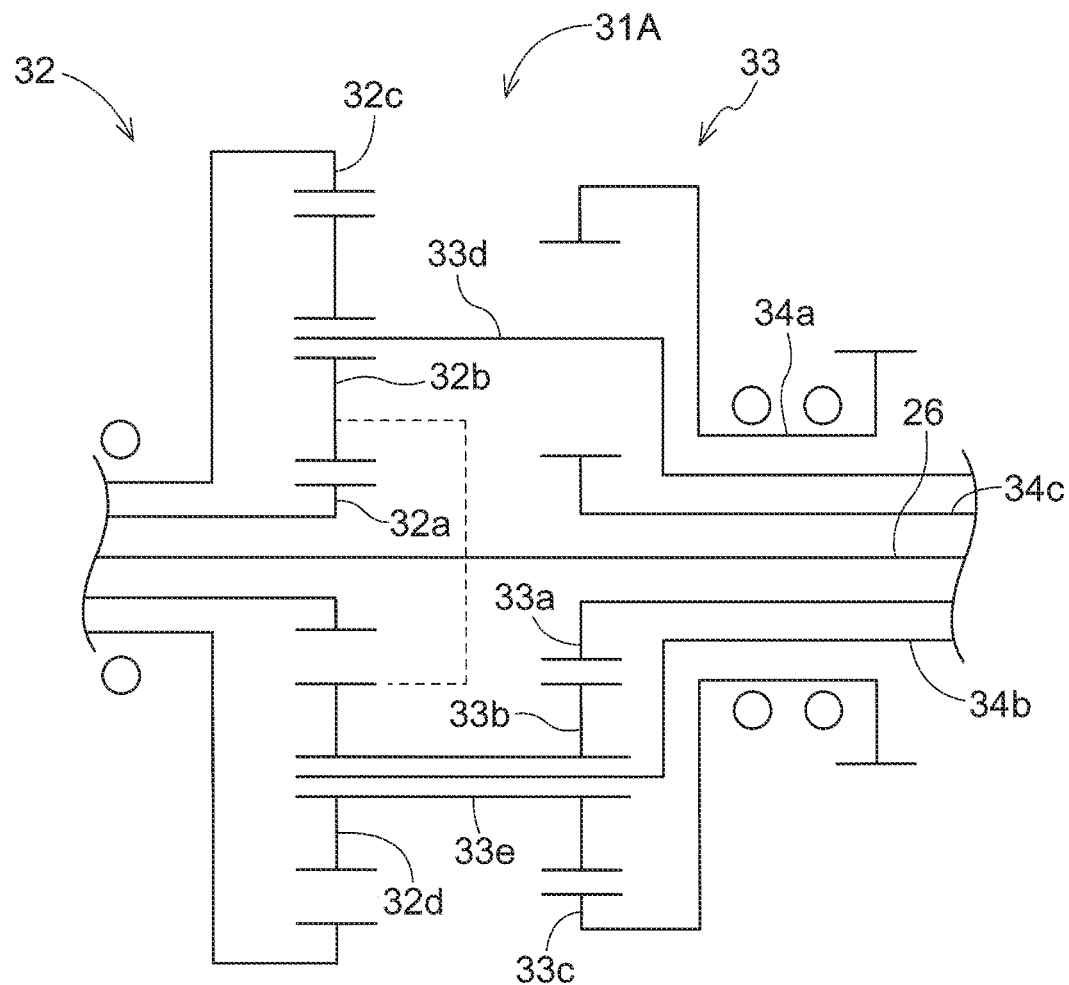
FIG. 3 is a diagram schematically illustrating a planetary transmission.

The planetary transmission 31, as illustrated in FIG. 2, includes a planetary transmission unit 31A and an output section 31B. The planetary transmission unit 31A is configured to receive motive power from the input shaft 20 and the output from the continuously variable transmission 28. The output section 31B is configured to receive motive power from the planetary transmission unit 31A and output the motive power in one of four speed ranges. As illustrated in FIGS. 2 and 3, the planetary transmission unit 31A includes a first planetary transmission 32 including (i) a first sun gear 32a, (ii) a first planetary gear 32b meshing with the first sun gear 32a, and (iii) a first ring gear 32c including inner teeth meshing with the first planetary gear 32b. The planetary transmission unit 31A also includes a second planetary transmission 33 backward of the first planetary transmission 32 and including (i) a second sun gear 33a, (ii) a second planetary gear 33b meshing with the second sun gear 33a, (iii) a second ring gear 33c including inner teeth meshing with the second planetary gear 33b, and (iv) a second carrier 33d holding the second planetary gear 33b.

As illustrated in FIG. 2, the main transmission 21 includes a second gear mechanism 30 extending from the first sun gear 32a to the motor shaft 28b of the continuously variable transmission 28 and configured to transmit the output from the continuously variable transmission 28 to the first sun gear 32a. The main transmission 21 includes a third gear mechanism 29 extending from the first ring gear 32c to the input shaft 20 and configured to transmit motive power from the input shaft 20 to the first ring gear 32c. As illustrated in FIGS. 2 and 3, the first planetary transmission 32 includes an interlocking gear 32d meshing with the first planetary gear 32b and coupled in an interlocked manner to the second planetary gear 33b with use of a coupler 33e. The first and second planetary transmissions 32 and 33 define a compound planetary transmission.

As illustrated in FIGS. 2 and 3, the output section 31B includes a first input shaft 34a, a second input shaft 34b, and a third input shaft 34c in a triple-shaft structure as well as an output shaft 35 parallel to, for example, the first input shaft 34a. The first input shaft 34a is coupled to the second ring gear 33c. The second input shaft 34b is coupled to the second carrier 33d. The third input shaft 34c is coupled to the second sun gear 33a. The first input shaft 34a is coupled to a first range gear mechanism 36a. The main transmission 21 includes a first clutch CL1 extending from the first range gear mechanism 36a to the output shaft 35. The third input shaft 34c is coupled to a second range gear mechanism 36b. The main transmission 21 includes a second clutch CL2 extending from the second range gear mechanism 36b to the output shaft 35. The second input shaft 34b is coupled to a third range gear mechanism 36c. The main transmission 21 includes a third clutch CL3 extending from the third range gear mechanism 36c to the output shaft 35. The third input shaft 34c is coupled to a fourth range gear mechanism 36d. The main transmission 21 includes a fourth clutch CL4 extending from the fourth range gear mechanism 36d to the output shaft 35.

The main transmission 21 is configured such that the engine 4 transmits motive power through the input shaft 20, the rotary shaft 26, and the first gear mechanism 27 to the hydraulic pump P. The continuously variable transmission 28 varies the motive power into normal-direction motive power or reverse-direction motive power and outputs the resulting motive power from the motor shaft 28b. The continuously variable transmission 28 also continuously varies the number of revolutions of the motive power to be outputted. The continuously variable transmission 28 transmits the motive power through the second gear mechanism 30 to the first sun gear 32a of the first planetary transmission 32. The engine 4 transmits motive power through the input shaft 20 and the third gear mechanism 29 to the first ring gear 32c of the first planetary transmission 32. The first and second planetary transmissions 32 and 33 composite (i) the motive power from the continuously variable transmission 28 and (ii) the motive power from the engine 4. The second planetary transmission 33 transmits the composite motive power to the output section 31B, which then outputs the composite motive power from its output shaft 35.

The main transmission 21 is configured such that, in response to the continuously variable transmission 28 being varied with the first clutch CL1 engaged, the composite motive power as composited by the planetary transmission unit 31A is transmitted from the second ring gear 33c to the first input shaft 34a of the output section 31B. The output section 31B then converts the composite motive power into motive power continuously variable within the first-gear range with use of the first range gear mechanism 36a and the first clutch CL1, and outputs the resulting motive power from the output shaft 35.

In response to the continuously variable transmission 28 being varied with the second clutch CL2 engaged, the composite motive power as composited by the planetary transmission unit 31A is transmitted from the second sun gear 33a to the third input shaft 34c of the output section 31B. The output section 31B then converts the composite motive power into motive power continuously variable within the second-gear range with use of the second range gear mechanism 36b and the second clutch CL2, and outputs the resulting motive power from the output shaft 35.

In response to the continuously variable transmission 28 being varied with the third clutch CL3 engaged, the composite motive power as composited by the planetary transmission unit 31A is transmitted from the second carrier 33d to the second input shaft 34b of the output section 31B. The output section 31B then converts the composite motive power into motive power continuously variable within the third-gear range with use of the third range gear mechanism 36c and the third clutch CL3, and outputs the resulting motive power from the output shaft 35.

In response to the continuously variable transmission 28 being varied with the fourth clutch CL4 engaged, the composite motive power as composited by the planetary transmission unit 31A is transmitted from the second sun gear 33a to the third input shaft 34c of the output section 31B. The output section 31B then converts the composite motive power into motive power continuously variable within the fourth-gear range with use of the fourth range gear mechanism 36d and the fourth clutch CL4, and outputs the resulting motive power from the output shaft 35.

As illustrated in FIG. 2, the forward/backward travel switching device 23 includes an input shaft 23a, an output shaft 23b, a forward-travel gear interlocking mechanism 23c, and a backward-travel gear interlocking mechanism 23d. The input shaft 23a is coupled to the output shaft 35 of the planetary transmission 31. The output shaft 23b is parallel to the input shaft 23a. The input shaft 23a is provided with a forward clutch CLF and a reverse clutch CLR. The forward-travel gear interlocking mechanism 23c extends from the forward clutch CLF to the output shaft 23b. The backward-travel gear interlocking mechanism 23d extends from the reverse clutch CLR to the output shaft 23b.

Engaging the forward clutch CLF couples the input shaft 23a to the forward-travel gear interlocking mechanism 23c. This achieves a forward-travel power transmission state, in which motive power from the input shaft 23a is transmitted through the forward-travel gear interlocking mechanism 23c to the output shaft 23b. Engaging the reverse clutch CLR couples the input shaft 23a to the backward-travel gear to interlocking mechanism 23d. This achieves a backward-travel power transmission state, in which motive power from the input shaft 23a is transmitted through the backward-travel gear interlocking mechanism 23d to the output shaft 23b.

The forward/backward travel switching device 23 receives the output from the planetary transmission 31 at the input shaft 23a. Engaging the forward clutch CLF causes motive power from the input shaft 23a to be converted by the forward clutch CLF and the forward-travel gear interlocking mechanism 23c into forward-travel motive power to be transmitted to the output shaft 23b. Engaging the reverse clutch CLR causes motive power from the input shaft 23a to be converted by the reverse clutch CLR and the backward-travel gear interlocking mechanism 23d into backward-travel motive power to be transmitted to the output shaft 23b. The output shaft 23b transmits the forward-travel motive power and backward-travel motive power through the gear mechanism 24 to the rear-wheel differential mechanism 16 and the front-wheel power transmission 25.

The rear-wheel differential mechanism 16 receives the forward-travel motive power or backward-travel motive power from the forward/backward travel switching device 23, and transmits the motive power from a pair of left and right output shafts 16b to the respective rear wheels 2. The left output shaft 16b transmits its motive power through a planetary deceleration mechanism 37 to the left rear wheel 2. The left output shaft 16b is provided with a steering brake 38. The right output shaft 16b transmits its motive power to the right rear wheel 2 in a system including a planetary deceleration mechanism 37 and a steering brake 38 (not illustrated in the drawing) similarly to the power transmission system for the left rear wheel 2.

As illustrated in FIG. 2, the front-wheel power transmission 25 includes an input shaft 25a and an output shaft 25b. The input shaft 25a is coupled to the output shaft 24a of the gear mechanism 24. The output shaft 25b is parallel to the input shaft 25a. The input shaft 25a is provided with a constant-rate clutch CLT and a rate-increasing clutch CLH backward of the constant-rate clutch CLT. The front-wheel power transmission 25 includes a constant-rate gear mechanism 40 extending from the constant-rate clutch CLT to the output shaft 25b and a rate-increasing gear mechanism 41 extending from the rate-increasing clutch CLH to the output shaft 25b. The output shaft 24a of the gear mechanism 24 is provided with a parking brake 39.

The front-wheel power transmission 25 is configured such that, engaging the constant-rate clutch CLT causes motive power from the input shaft 25a to be transmitted through the constant-rate clutch CLT and the constant-rate gear mechanism 40 to the output shaft 25b. Further, the constant-rate gear mechanism 40 achieves a constant-rate power transmission state, in which the output shaft 25b outputs motive power for driving the front wheels 1 such that the front wheels 1 have a circumferential speed equal to that of the rear wheels 2. Engaging the rate-increasing clutch CLH causes motive power from the input shaft 25a to be transmitted through the rate-increasing clutch CLH and the rate-increasing gear mechanism 41 to the output shaft 25b. Further, the rate-increasing gear mechanism 41 achieves a front-wheel rate-increasing power transmission state, in which the output shaft 25b outputs motive power for driving the front wheels 1 such that the front wheels 1 have a circumferential speed higher than that of the rear wheels 2. The output from the output shaft 25b is received by the front-wheel differential mechanism 17 through a rotary shaft 42 coupling the output shaft 25b to the input shaft 17a of the front-wheel differential mechanism 17.

The body 3 is configured such that, engaging the constant-rate clutch CLT leads to a four-wheel drive mode in which the front and rear wheels 1 and 2 are driven such that the front wheels 1 have an average circumferential speed equal to that of the rear wheels 2. Engaging the rate-increasing clutch CLH leads to a four-wheel drive mode in which the front and rear wheels 1 and 2 are driven such that the front wheels 1 have an average circumferential speed higher than that of the rear wheels 2. Engaging the rate-increasing clutch CLH allows the body 3 to turn with a radius smaller than when the constant-rate clutch CLT is engaged.

Figure 4:
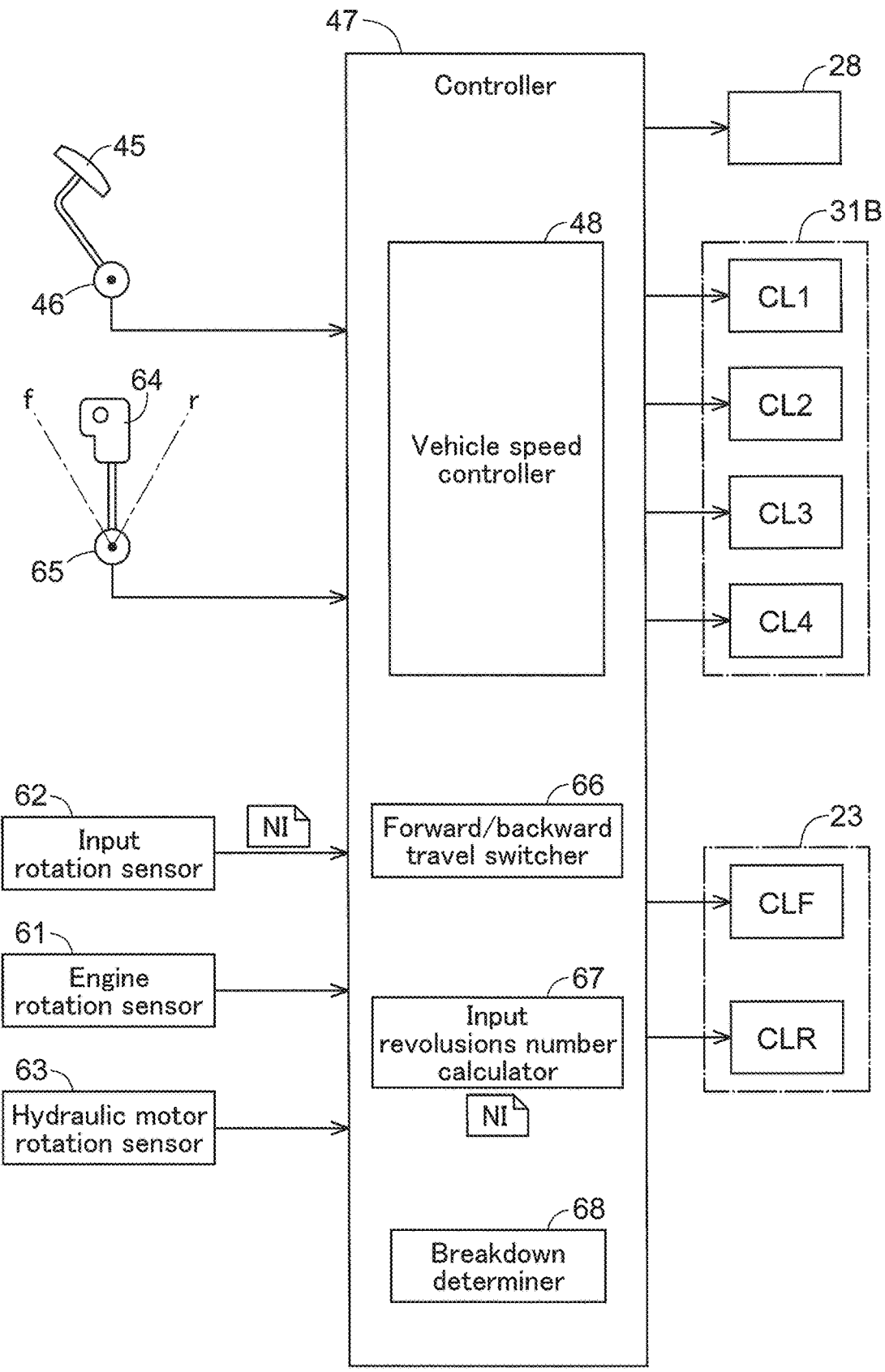
FIG. 4 is a block diagram illustrating a control configuration.

The driver section 6 includes a shift pedal 45 (see FIG. 4) as a speed change operation tool for varying the continuously variable transmission 28. As illustrated in FIG. 4, the tractor includes a first potentiometer 46 and a controller 47. The first potentiometer 46 is configured to detect the position of the shift pedal 45 as operated, and is linked to the controller 47. The present preferred embodiment, which includes a first potentiometer 46, may alternatively include any of various position detecting mechanisms such as a mechanism including a detection switch.

As illustrated in FIG. 4, the controller 47 is linked to the continuously variable transmission 28. The controller 47 preferably may be or include a microcomputer, and may be configured or programmed to include a vehicle speed controller 48 configured or programmed to detect based on information detected by the first potentiometer 46 that the shift pedal 45 has been operated and vary the continuously variable transmission 28.

As illustrated in FIG. 4, the controller 47 is linked to the first to fourth clutches CL1 to CL4, and allows the vehicle speed controller 48 to switch the first to fourth clutches CL1 to CL4.

Specifically, the first to fourth clutches CL1 to CL4 are each of a hydraulic type. The controller 47 is linked to first to fourth switching valves (not illustrated in the drawings) connected respectively to the first to fourth clutches CL1 to CL4, and allows the vehicle speed controller 48 to switch the first to fourth switching valves.

As illustrated in FIG. 4, the tractor includes an engine rotation sensor 61 configured to detect the number of revolutions of the engine 4, an input rotation sensor 62 configured to detect the number of revolutions of the input shaft 23a, and a hydraulic motor rotation sensor 63 configured to detect the number of revolutions of the hydraulic motor M. These three sensors are linked to the controller 47. The input rotation sensor 62 is, as illustrated in FIG. 2, configured to detect the number of revolutions of a gear 59 provided for the input shaft 23a as the number of revolutions of the input shaft 23a. The input rotation sensor 62 is, in other words, configured to detect an input revolutions number NI, that is, the number of revolutions of motive power inputted to the forward/backward travel switching device 23. The hydraulic motor rotation sensor 63 is configured to detect the number of revolutions of a gear 60 provided for the motor shaft 28b as the number of revolutions of the hydraulic motor M, the gear 60 being included in the second gear mechanism 30.

The vehicle speed controller 48 is configured or programmed to, based on the value detected by the engine rotation sensor 61 and the value detected by the input rotation sensor 62, calculate the gear ratio in speed-changing power transmission between the engine 4 and the input shaft 23a (that is, the number of revolutions of the input shaft 23a/the number of revolutions of the engine 4). The vehicle speed controller 48 is also configured or programmed to, based on the calculated gear ratio G and how the continuously variable transmission 28 has been varied, switch the first to fourth clutches CL1 to CL4 to vary the rotation speed V of the input shaft 23a, which corresponds (that is, is proportional) to the vehicle speed. The vehicle speed controller 48 is configured or programmed to bring the number of revolutions of the input shaft 23a closer to a target number of revolutions to control the vehicle speed.

Figure 5:
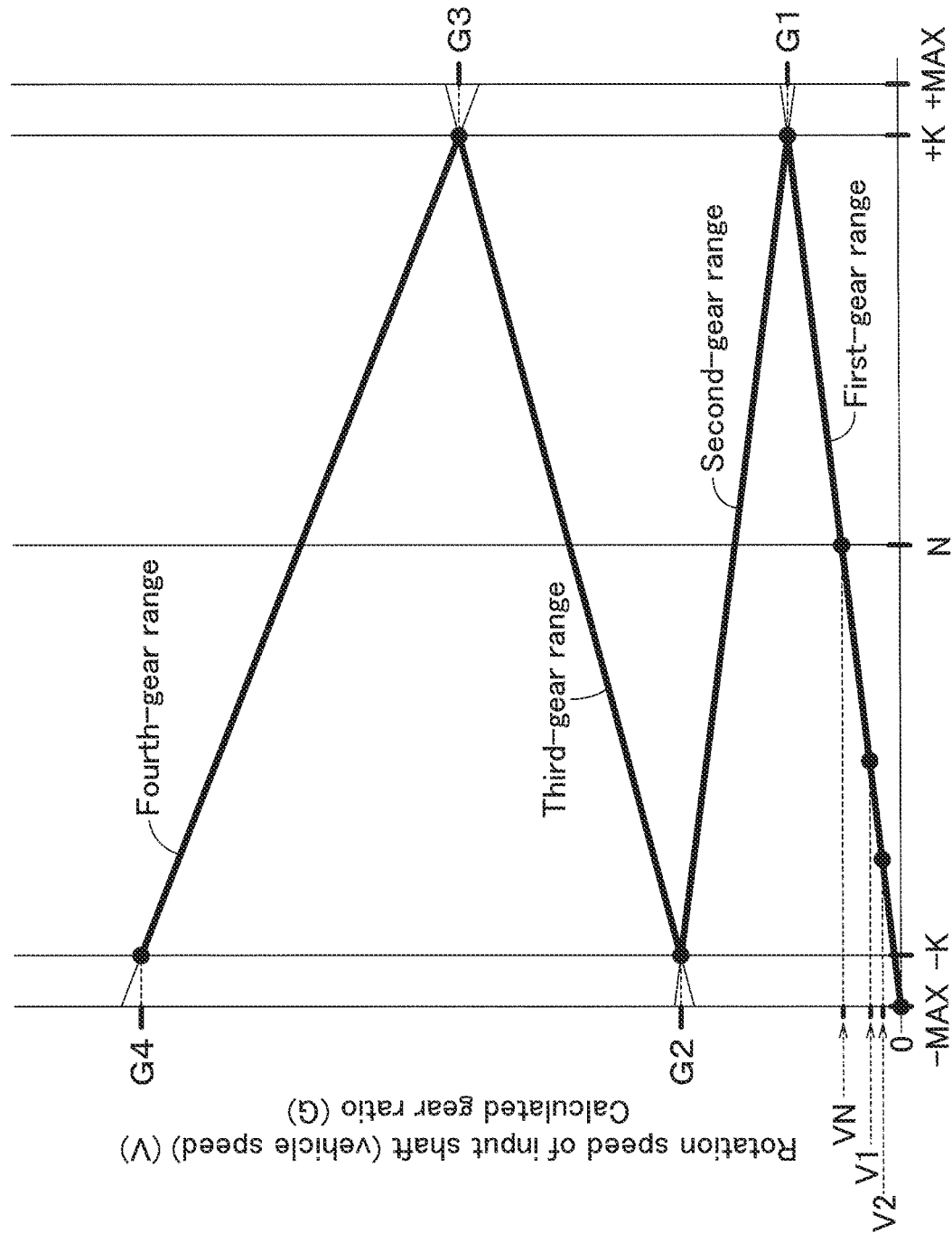
FIG. 5 is a diagram illustrating how a controller changes the vehicle speed.

FIG. 5 is a diagram illustrating how the vehicle speed controller 48 changes the vehicle speed. The drawing shows a vertical axis indicative of the calculated gear ratio G and the rotation speed V of the input shaft 23a (which corresponds to the vehicle speed) and a horizontal axis indicative of how the continuously variable transmission 28 has been varied. The symbol "N" indicates the neutral state. The symbol "−MAX" indicates that the continuously variable transmission 28 has been varied to output reverse-direction motive power for the maximum speed. The symbol "+MAX" indicates that the continuously variable transmission 28 has been varied to output normal-direction motive power for the maximum speed. The symbol "−K" indicates that the continuously variable transmission 28 has been varied to a level for switching the clutch on the reverse-rotation side (that is, before reaching −MAX). The symbol "+K" indicates that the continuously variable transmission 28 has been varied to a level for switching the clutch on the normal-rotation side (that is, before reaching +MAX). The symbols "G1", "G2", "G3", and "G4" refer to preset gear ratios.

Varying the continuously variable transmission 28 from −MAX toward +MAX with the first clutch CL1 engaged increases the rotation speed V in the first-gear range continuously from zero speed. In response to the continuously variable transmission 28 reaching +K and the calculated gear ratio G reaching G1, the vehicle speed controller 48 disengages the first clutch CL1 and engages the second clutch CL2. Varying the continuously variable transmission 28 toward −MAX with the second clutch CL2 engaged increases the rotation speed V in the second-gear range continuously. In response to the continuously variable transmission 28 reaching −K and the calculated gear ratio G reaching G2, the vehicle speed controller 48 disengages the second clutch CL2 and engages the third clutch CL3. Varying the continuously variable transmission 28 toward +MAX with the third clutch CL3 engaged increases the rotation speed V in the third-gear range continuously. In response to the continuously variable transmission 28 reaching +K and the calculated gear ratio G reaching G3, the vehicle speed controller 48 disengages the third clutch CL3 and engages the fourth clutch CL4. Varying the continuously variable transmission 28 toward −MAX with the fourth clutch CL4 engaged increases the rotation speed V in the fourth-gear range continuously.

The driver section 6 includes a forward/backward travel lever 64 (see FIG. 4) as a forward/backward travel switching tool for use in switching the forward/backward travel switching device 23. As illustrated in FIG. 4, the tractor includes a second potentiometer 65 that is configured to detect the position of the forward/backward travel lever 64 as operated and that is linked to the controller 47. The present preferred embodiment, which includes a second potentiometer 65, may alternatively include any of various position detecting mechanisms such as a mechanism including a detection switch.

As illustrated in FIG. 4, the controller 47 is linked to the forward/backward travel switching device 23. The controller 47 includes a forward/backward travel switcher 66 configured to, in response to the forward/backward travel lever 64 being operated, (i) detect a switch of forward/backward travel based on information detected by the second potentiometer 65 and (ii) switch the forward/backward travel switching device 23 into the forward-travel power transmission state or the backward-travel power transmission state in correspondence with the position of the forward/backward travel lever 64 (that is, a forward-travel position f or a reverse-travel position r). The forward and reverse clutches CLF and CLR are each operable based on oil pressure, and are each configured to receive operating oil to be engaged and discharge operating oil to be disengaged. The forward and reverse clutches CLF and CLR are connected respectively to a forward-travel operation valve and a backward-travel operation valve (not illustrated in the drawings) both linked to the controller 47 and controllable by the forward/backward travel switcher 66. This allows the forward/backward travel switcher 66 to switch the forward/backward travel switching device 23.

As illustrated in FIG. 4, the controller 47 is configured or programmed to include an input revolutions number calculator 67 and a breakdown determiner 68 in addition to the vehicle speed controller 48 and the forward/backward travel switcher 66.

The input revolutions number calculator 67 is configured or programmed to calculate an input revolutions number NI based on (i) the value detected by the engine rotation sensor 61 (that is, the number of revolutions of the engine 4 as detected by the engine rotation sensor 61) and (ii) the value detected by the hydraulic motor rotation sensor 63 (that is, the number of revolutions of the hydraulic motor M as detected by the hydraulic motor rotation sensor 63). More precisely, the input revolutions number calculator 67 is configured or programmed to calculate an input revolutions number NI based on the value detected by the engine rotation sensor 61, the value detected by the hydraulic motor rotation sensor 63, and the gear ratio (specifically, between the third gear mechanism 29, the second gear mechanism 30, and the planetary transmission 31). The vehicle speed controller 48 is switchable into a first vehicle-speed control mode and a second vehicle-speed control mode. In the first vehicle-speed control mode, the vehicle speed controller 48 controls the vehicle speed based on the value detected by the input rotation sensor 62 (that is, the input revolutions number NI detected by the input rotation sensor 62). In the second vehicle-speed control mode, the vehicle speed controller 48 controls the vehicle speed based on the value calculated by the input revolutions number calculator 67 (that is, the input revolutions number NI calculated by the input revolutions number calculator 67). The breakdown determiner 68 is configured or programmed to determine whether the hydraulic motor rotation sensor 63 is broken down.

Figure 6:
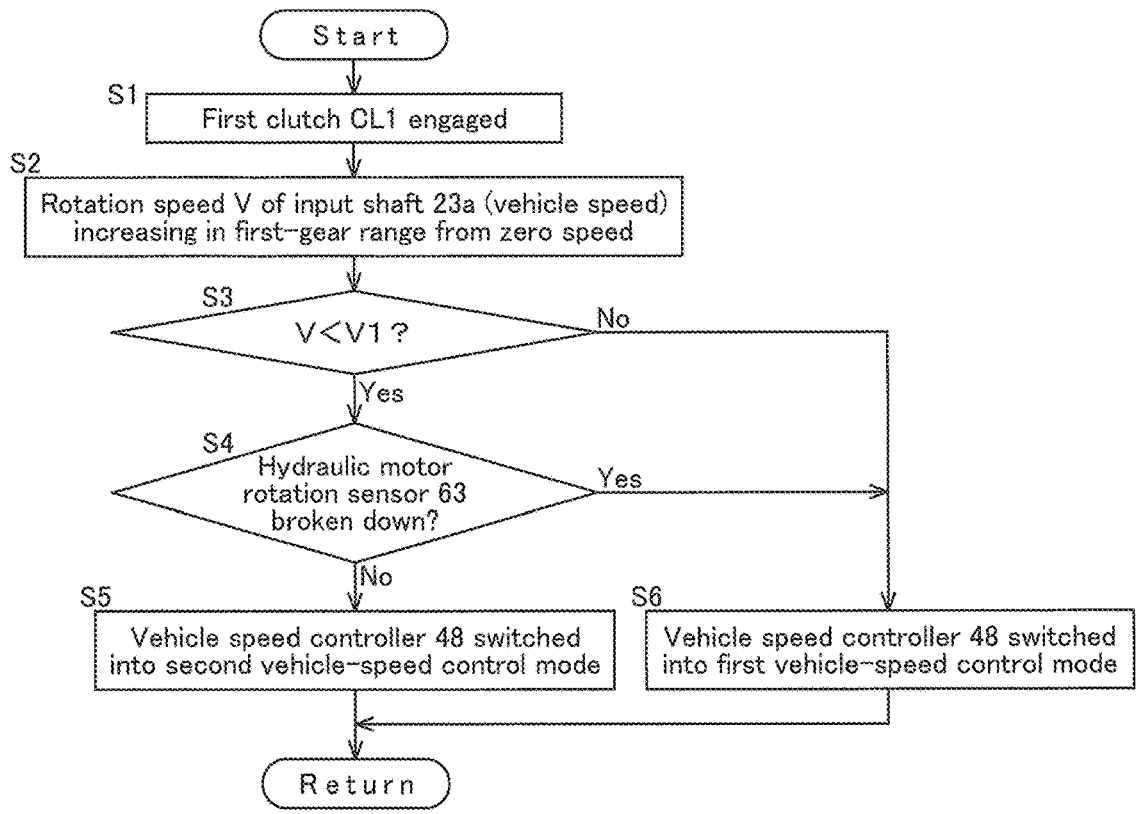
FIG. 6 is a flowchart of how a vehicle speed controller controls the vehicle speed.

As illustrated in FIG. 6, with the first clutch CL1 engaged (S1) and simultaneously the rotation speed V of the input shaft 23a (that is, the vehicle speed) increasing in the first-gear range from zero speed (S2), if the rotation speed V of the input shaft 23a (that is, the vehicle speed) is below a first threshold value V1 (yes in S3), and if the breakdown determiner 68 did not determine that the hydraulic motor rotation sensor 63 is broken down (no in S4), the vehicle speed controller 48 is switched into the second vehicle-speed control mode (S5). The vehicle speed controller 48 is, in other words, in the second vehicle-speed control mode while the rotation speed V of the input shaft 23a (that is, the vehicle speed) is low (for the present preferred embodiment, while the rotation speed V of the input shaft 23a [that is, the vehicle speed] is below the first threshold value V1).

If the rotation speed V of the input shaft 23a (that is, the vehicle speed) is not below the first threshold value V1 (no in S3), the vehicle speed controller 48 is switched into the first vehicle-speed control mode (S6). Further, if the rotation speed V of the input shaft 23a (that is, the vehicle speed) is below the first threshold value V1 (yes in S3), and if the breakdown determiner 68 has determined that the hydraulic motor rotation sensor 63 is broken down (yes in S4), the vehicle speed controller 48 is switched into the first vehicle-speed control mode (S6). In other words, if the breakdown determiner 68 has determined that the hydraulic motor rotation sensor 63 is broken down (yes in S4), the vehicle speed controller 48 is not switched into the second vehicle-speed control mode (S6).

As illustrated in FIG. 2, the input rotation sensor 62 is proximate to the front wheels 1 (see FIG. 1) and the rear wheels 2, and is capable of directly detecting the vehicle speed. The vehicle speed controller 48 thus controls the vehicle speed based on the value detected by the input rotation sensor 62 (that is, in the first vehicle-speed control mode) at normal vehicle speeds. The vehicle speed controller 48 might, however, be incapable of controlling the vehicle speed stably at low speeds (that is, close to zero speed) as a result of a slow cycle of updating the number of revolutions of the input shaft 23a due to a low vehicle speed (that is, slow rotation of the input shaft 23a). The vehicle speed controller 48 is, in view of that, configured or programmed to control the vehicle speed based on the values detected by sensors other than the input rotation sensor 62, namely the engine rotation sensor 61 and the hydraulic motor rotation sensor 63 (that is, in the second vehicle-speed control mode), while the vehicle speed is low to receive accurate information on the number of revolutions within a predetermined time period.

Figure 7:
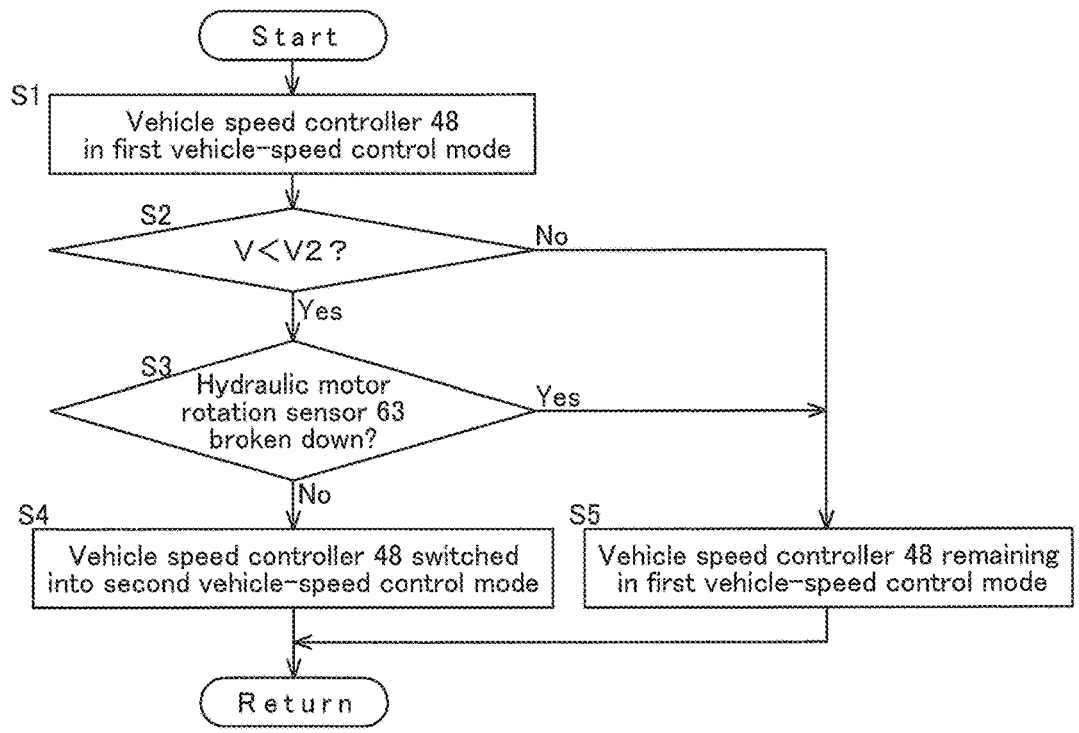
FIG. 7 is a flowchart of how a vehicle speed controller controls the vehicle speed.

As illustrated in FIG. 7, with the vehicle speed controller 48 in the first vehicle-speed control mode (S1), in response to the rotation speed V of the input shaft 23a (that is, the vehicle speed) becoming below a second threshold value V2 (yes in S2), if the breakdown determiner 68 did not determine that the hydraulic motor rotation sensor 63 is broken down (no in S3), the vehicle speed controller 48 is switched into the second vehicle-speed control mode (S4).

If the rotation speed V of the input shaft 23a (that is, the vehicle speed) is not below the second threshold value V2 (no in S2), the vehicle speed controller 48 remains in the first vehicle-speed control mode (S5). Further, if the rotation speed V of the input shaft 23a (that is, the vehicle speed) is below the second threshold value V2 (yes in S2), and if the breakdown determiner 68 has determined that the hydraulic motor rotation sensor 63 is broken down (yes in S3), the vehicle speed controller 48 remains in the first vehicle-speed control mode (S5). In other words, if the breakdown determiner 68 has determined that the hydraulic motor rotation sensor 63 is broken down (yes in S3), the vehicle speed controller 48 is not switched into the second vehicle-speed control mode (S5).

As illustrated in FIG. 5, the first and second threshold values V1 and V2 are each related to the rotation speed V of the input shaft 23a (that is, the vehicle speed). The first threshold value V1 is a threshold value at which the vehicle speed controller 48 is switched from the second vehicle-speed control mode into the first vehicle-speed control mode. The first threshold value V1 is smaller than the value of that rotation speed VN of the input shaft 23a (that is, the vehicle speed) which corresponds to the neutral state N of the continuously variable transmission 28 in the first-gear range. The first threshold value V1 may be, for example, the value of that rotation speed V of the input shaft 23a (that is, the vehicle speed) which corresponds to the value (substantially) at the midpoint between N (that is, the neutral state of the continuously variable transmission 28) and −MAX (that is, the reverse-direction motive power for the maximum speed) or −K (that is, for switching the clutch on the reverse-rotation side) in the first-gear range. The second threshold value V2 is a threshold value at which the vehicle speed controller 48 is switched from the first vehicle-speed control mode into the second vehicle-speed control mode. The second threshold value V2 is smaller than the first threshold value V1. The configuration described above prevents the vehicle speed controller 48 from being switched too frequently between the first and second vehicle-speed control modes while the vehicle speed is low, and thereby prevents the vehicle speed from being discontinuous.

ALTERNATIVE PREFERRED EMBODIMENTS

The input rotation sensor 62 for the preferred embodiments described above preferably is configured to detect the number of revolutions of the input shaft 23a. The input rotation sensor 62 may alternatively be configured to detect the number of revolutions of the output shaft 35.

The second threshold value V2 for the preferred embodiments described above preferably is smaller than the first threshold value V1. The second threshold value V2 may alternatively be equal to the first threshold value V1.

The preferred embodiments described above are preferably configured such that if the breakdown determiner 68 has determined that the hydraulic motor rotation sensor 63 is broken down, the vehicle speed controller 48 is not switched into the second vehicle-speed control mode. The preferred embodiments may be altered such that (i) if the breakdown determiner 68 has determined that the engine rotation sensor 61 is broken down, the vehicle speed controller 48 is not switched into the second vehicle-speed control mode or that (ii) if the breakdown determiner 68 has determined that the input rotation sensor 62 is broken down, the vehicle speed controller 48 is not switched into the first vehicle-speed control mode.

The preferred embodiments described above may be altered such that the transmission 18 includes an auxiliary transmission configured to vary motive power from the forward/backward travel switching device 23. In this case, the vehicle speed controller 48 should preferably be in the second vehicle-speed control mode while the auxiliary transmission is in its lowest speed step.

Preferred embodiments of the present invention are applicable to work vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle, comprising:
   an engine;
   a movable body;
   a hydrostatic, continuously variable transmission including:
     a hydraulic pump drivable by motive power from the engine; and
     a hydraulic motor drivable by pressurized oil from the hydraulic pump;
   the continuously variable transmission being operable to vary the motive power from the engine and output the varied motive power;
   a planetary transmission to receive the motive power from the engine and the motive power from the continuously variable transmission, composite the motive power from the engine and the motive power from the continuously variable transmission, and output the composite motive power;
   a forward and backward travel switching device switchable between a forward-travel power transmission state and a backward-travel power transmission state, such that, in the forward-travel power transmission state, the forward and backward travel switching device switches the motive power from the planetary transmission into forward-travel motive power and outputs the forward-travel motive power to the movable body, and in the backward-travel power transmission state, the forward and backward travel switching device switches the motive power from the planetary transmission into backward-travel motive power and outputs the backward-travel motive power to the movable body;
   an engine rotation sensor to detect a number of revolutions of the engine;
   a hydraulic motor rotation sensor to detect a number of revolutions of the hydraulic motor;
   an input rotation sensor to detect an input revolutions number as a number of revolutions of motive power inputted to the forward and backward travel switching device; and
   a controller configured or programmed to include:
     an input revolutions number calculator to calculate the input revolutions number based on a value detected by the engine rotation sensor and a value detected by the hydraulic motor rotation sensor; and
     a vehicle speed controller switchable between a first vehicle-speed control mode and a second vehicle-speed control mode, such that, in the first vehicle-speed control mode, the vehicle speed controller is configured or programmed to control a vehicle speed of the work vehicle based on a value detected by the input rotation sensor, and in the second vehicle-speed control mode, the vehicle speed controller is configured or programmed to control the vehicle speed based on a value calculated by the input revolutions number calculator.

2. The work vehicle according to claim 1, wherein the vehicle speed controller is configured or programmed to be in the second vehicle-speed control mode while the vehicle speed is low.

3. The work vehicle according to claim 2, wherein the vehicle speed controller is configured or programmed to switch from the second vehicle-speed control mode into the first vehicle-speed control mode at a first threshold value of the vehicle speed and from the first vehicle-speed control mode into the second vehicle-speed control mode at a second threshold value of the vehicle speed, wherein the second threshold value is smaller than the first threshold value.

4. The work vehicle according to claim 2, wherein
   the controller is configured or programmed to further include a breakdown determiner to determine whether the hydraulic motor rotation sensor is broken down; and
   the vehicle speed controller is configured or programmed to not switch into the second vehicle-speed control mode if the breakdown determiner has determined that the hydraulic motor rotation sensor is broken down.

5. The work vehicle according to claim 2, wherein
   the controller is configured or programmed to further include a breakdown determiner to determine whether the engine rotation sensor is broken down; and
   the vehicle speed controller is configured or programmed to not switch into the second vehicle-speed control mode if the breakdown determiner has determined that the engine rotation sensor is broken down.

6. The work vehicle according to claim 2, wherein
   the controller is configured or programmed to further include a breakdown determiner to determine whether the input rotation sensor is broken down; and
   the vehicle speed controller is configured or programmed to not switch into the first vehicle speed control mode if the breakdown determiner has determined that the input rotation sensor is broken down.

7. The work vehicle according to claim 2, further comprising:
   an auxiliary transmission to vary motive power from the forward and backward travel switching device; wherein
   the vehicle speed controller is configured or programmed to be in the second vehicle-speed control mode while the auxiliary transmission is operating in a lowest speed.

8. The work vehicle according to claim 1, wherein the vehicle speed controller is configured or programmed to be switched from the second vehicle-speed control mode into the first vehicle-speed control mode at a first threshold value of the vehicle speed and from the first vehicle-speed control mode into the second vehicle-speed control mode at a second threshold value of the vehicle speed, wherein the second threshold value is smaller than the first threshold value.

9. The work vehicle according to claim 1, wherein
the controller is configured or programmed to further include a breakdown determiner to determine whether the hydraulic motor rotation sensor is broken down; and
the vehicle speed controller is configured or programmed to not switch into the second vehicle-speed control mode if the breakdown determiner has determined that the hydraulic motor rotation sensor is broken down.

10. The work vehicle according to claim 1, wherein
the controller is configured or programmed to further include a breakdown determiner to determine whether the engine rotation sensor is broken down; and
the vehicle speed controller is configured or programmed to not switch into the second vehicle-speed control mode if the breakdown determiner has determined that the engine rotation sensor is broken down.

11. The work vehicle according to claim 1, wherein
the controller is configured or programmed to further include a breakdown determiner to determine whether the input rotation sensor is broken down; and
the vehicle speed controller is configured or programmed to not switch into the first vehicle-speed control mode if the breakdown determiner has determined that the input rotation sensor is broken down.

12. The work vehicle according to claim 1, further comprising:
an auxiliary transmission to vary motive power from the forward and backward travel switching device; wherein
the vehicle speed controller is configured or programmed to be in the second vehicle-speed control mode while the auxiliary transmission is operating in a lowest speed.

* * * * *